United States Patent
Schmid et al.

(10) Patent No.: US 8,942,065 B2
(45) Date of Patent: Jan. 27, 2015

(54) METHOD AND DEVICE FOR DETERMINING THE POSITION OF AN OBJECT IN RELATION TO A VEHICLE, IN PARTICULAR A MOTOR VEHICLE, FOR USE IN A DRIVER ASSISTANCE SYSTEM OF THE VEHICLE

(75) Inventors: Dirk Schmid, Simmonzheim (DE); Michael Schumann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 168 days.

(21) Appl. No.: 13/696,912

(22) PCT Filed: Apr. 26, 2011

(86) PCT No.: PCT/EP2011/056519
§ 371 (c)(1),
(2), (4) Date: Jan. 25, 2013

(87) PCT Pub. No.: WO2011/141289
PCT Pub. Date: Nov. 17, 2011

(65) Prior Publication Data
US 2013/0128699 A1 May 23, 2013

(30) Foreign Application Priority Data
May 11, 2010 (DE) .......................... 10 2010 028 829

(51) Int. Cl.
*G01S 15/93* (2006.01)
*G01S 15/42* (2006.01)
(Continued)

(52) U.S. Cl.
CPC ............... *G01S 15/931* (2013.01); *G01S 15/42* (2013.01); *G01S 13/46* (2013.01); *G01S 2013/468* (2013.01); *G01S 15/878* (2013.01); *G01S 2015/938* (2013.01); *Y10S 367/909* (2013.01)
USPC .......................................... 367/103; 367/909

(58) Field of Classification Search
CPC ....... G01S 15/42; G01S 15/931; G01S 13/46; G01S 2015/938; G01S 2013/468; G01S 15/878

USPC ............................................ 367/99, 909, 103
See application file for complete search history.

(56) References Cited

U.S. PATENT DOCUMENTS

| 3,419,845 A | * 12/1968 | Berkelmann et al. ......... 367/103 |
| 2003/0214880 A1 | 11/2003 | Rowe |

(Continued)

FOREIGN PATENT DOCUMENTS

| DE | 31 04 993 | 8/1982 |
| DE | 40 23 538 | 1/1992 |
| DE | 195 41 459 | 5/1997 |
| WO | WO 2005/083 464 | 9/2005 |

OTHER PUBLICATIONS

International Search Report for PCT/EP2011/056519, dated Aug. 23, 2011.

(Continued)

*Primary Examiner* — Daniel Pihulic
(74) *Attorney, Agent, or Firm* — Kenyon & Kenyon LLP

(57) ABSTRACT

In a method and a device for determining the position of an object in relation to a vehicle, for use in a driver assistance system of the vehicle, a first ultrasound pulse is transmitted by an ultrasound sensor situated on the vehicle, the ultrasound pulse including multiple predefined transmission frequencies which result in a variation of the directional characteristic of the ultrasound sensor. The transmitted first ultrasound pulse is reflected on the object and is received again as a first echo pulse. A frequency spectrum of the first echo pulse is subsequently determined, and a first absolute value of a relative offset angle of the object is determined as a function of the frequency spectrum of the first echo pulse and the directional characteristics.

10 Claims, 3 Drawing Sheets

(51) Int. Cl.
*G01S 13/46* (2006.01)
*G01S 15/87* (2006.01)

(56) References Cited

U.S. PATENT DOCUMENTS

| 2005/0007882 A1* | 1/2005 | Bachelor et al. | 367/103 |
| 2008/0130413 A1* | 6/2008 | Bachelor et al. | 367/103 |
| 2010/0074057 A1* | 3/2010 | Bachelor et al. | 367/103 |
| 2013/0128699 A1* | 5/2013 | Schmid et al. | 367/99 |

OTHER PUBLICATIONS

Yata, T., et al., "Wall Following Using Angle Information Measured by a Single Ultrasonic Transducer", Robotics and Automation, 1998, Proceedings. 1998 IEEE International Conference on Leuven, Belgium, May 16-20, 1998, New York, USA, vol. 2, pp. 1590-1596.

* cited by examiner

Fig. 2
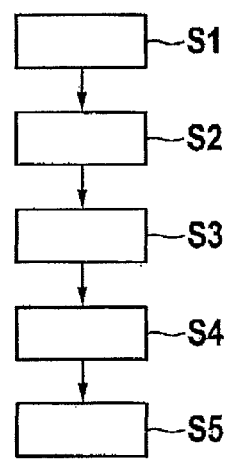
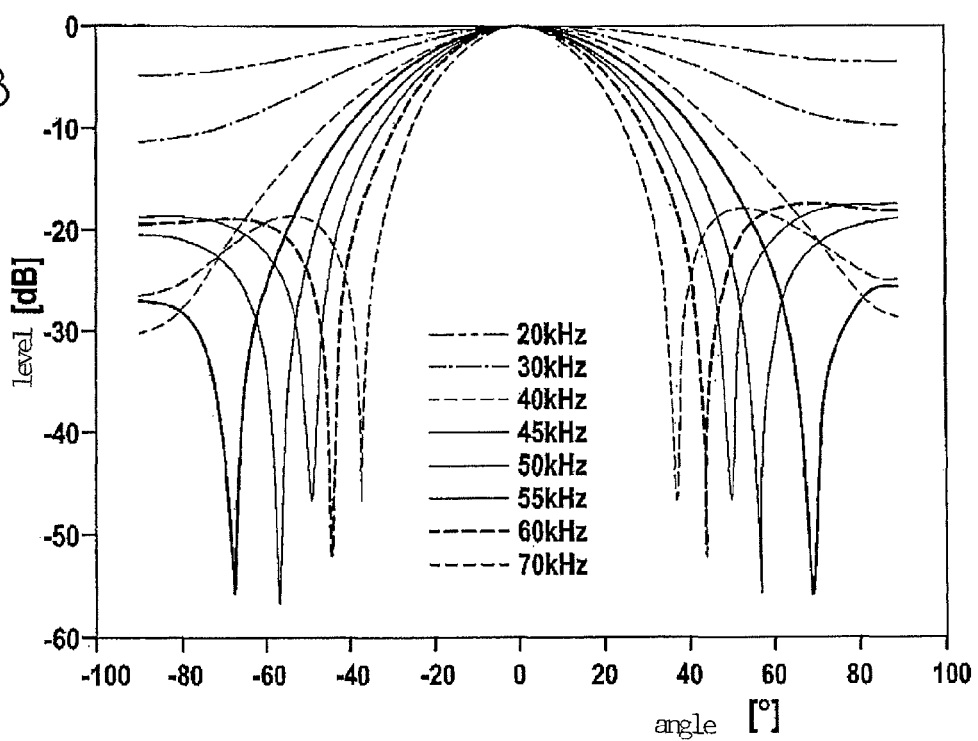

METHOD AND DEVICE FOR DETERMINING THE POSITION OF AN OBJECT IN RELATION TO A VEHICLE, IN PARTICULAR A MOTOR VEHICLE, FOR USE IN A DRIVER ASSISTANCE SYSTEM OF THE VEHICLE

BACKGROUND OF THE INVENTION

1. Field of the Invention

The present invention relates to a method and a device for determining the position of an object in relation to a vehicle, in particular a motor vehicle, for use in a driver assistance system of the vehicle.

2. Description of the Related Art

In the area of driver assistance systems for motor vehicles, ultrasound sensors were preferably used in the past. However, conventional ultrasound sensors only deliver information concerning the distance of an object in relation to the position of the ultrasound sensor but not concerning the relative offset angle of the object. However, for various driver assistance systems, such as, for example, parking space measurement or automatic parking systems, the relative position of an object, i.e., the offset angle, is of crucial importance in addition to the distance.

From published German patent application document DE 40 23 538 A1, a collision warning device having a device for contactless distance measurement is known, at least two ultrasonic sensors being situated at a predefined distance and a device for evaluating the transit times between the transmission of each ultrasonic signal and the reception of a reflected ultrasonic signal of the one and of the other ultrasonic sensor (cross measurement) being provided. In this connection, the device for evaluating the transit times is used for checking which of multiple predefined mathematical relationships comply with the distances calculated from the transit times, and one of multiple predefined equations is used for calculating a distance as a function of the result of the check. The type and the relative position of the object may be inferred in this way.

BRIEF SUMMARY OF THE INVENTION

The present invention provides a method for determining the position of an object in relation to a vehicle, in particular a motor vehicle, for use in a driver assistance system of the vehicle, a first ultrasound pulse being transmitted by an ultrasound sensor situated on the vehicle, the ultrasound pulse including multiple predefined transmission frequencies which result in a variation of the directional characteristic of the ultrasound sensor. The transmitted first ultrasound pulse is reflected on the object and is received again as a first echo pulse by the transmitting ultrasound sensor or another ultrasound sensor situated on the vehicle. A frequency spectrum of the first echo pulse is subsequently determined, and a first absolute value of a relative offset angle of the object is determined as a function of the frequency spectrum of the first echo pulse and the directional characteristics.

The present invention also provides a device for determining the position of an object in relation to a vehicle, in particular a motor vehicle, for use in a driver assistance system of the vehicle, having at least one ultrasound transmitter for transmitting at least one ultrasound pulse, the ultrasound pulse including multiple predefined transmission frequencies which result in a variation of the directional characteristic of the ultrasound sensor, and an ultrasound receiver for receiving an echo pulse reflected on the object. An evaluation unit determines a frequency spectrum of the echo pulse and determines an absolute value of a relative offset angle of the object as a function of the frequency spectrum and the directional characteristics.

It is advantageous in this context that a frequency-modulated ultrasound pulse is transmitted, in particular in the form of a chirp.

In the case of ultrasound sensors, the directional characteristic is a function of the transmission frequency. If the transmission frequency is varied, the directional characteristic is also changed. The directional characteristic describes the angular dependence of the strength of received or transmitted signals. Thus, the amplitude of the ultrasound pulse transmitted in the direction of the object and thus also the amplitude of the echo pulse resulting from the reflection on the object are, however, dependent on the transmission frequency and the relative offset angle of the object. The result of this relationship is that a targeted variation of the transmission frequency results in a characteristic frequency spectrum of the echo pulse as a function of the angular position of the object. If the directional characteristics for the individual transmission frequencies are known, it is possible to determine an absolute value of a relative offset angle of the object based on the frequency spectrum of the echo pulse.

By utilizing the dependence of the frequency spectrum on the directional characteristic and the relative offset angle of the object, it is possible, in contrast to known trilateration methods, to determine an absolute value of a relative offset angle of an object with the aid of a single ultrasound sensor. Moreover, ambiguities are avoided, such as those which occur when known trilateration methods are used under certain conditions, in particular when multiple objects are localized simultaneously. Thus, the method according to the present invention and the device according to the present invention contribute to a significant improvement of the quality of the position determination of an obstacle in relation to a vehicle and thus to the increased reliability of driver assistance systems.

Starting from a certain transmission frequency, minimums are formed in the directional characteristic of the ultrasound sensor between a main lobe and side lobes then occurring, the position of the minimums being a function of the particular transmission frequency. The result of these minimums is that only a transmission signal having a very low amplitude is transmitted in the direction corresponding to the particular angular value. Inevitably, an echo signal based on it also has only a very low amplitude, which is clearly identifiable in the frequency spectrum of the echo signal. From the frequency value at which this minimum occurs in the frequency spectrum of the echo signal, it is then possible to infer the absolute value of the object's relative offset angle if the directional characteristics are known. According to one specific embodiment of the present invention, the minimums in the frequency spectrum are therefore used for determining the absolute value of the relative offset value of the object.

Since the efficiency and thus the emitted power drops rapidly in the case of transmission frequencies far above the resonance frequency of the ultrasound sensor, it is practically impossible to increase the transmission frequency so far that minimums are developed in the directional characteristic and thus also in the frequency spectrum of the echo signal even in an angular range near the primary emission direction (emission direction 0°). However, due to the different shapes, in particular the different gradients, of the individual directional characteristics, an amplitude curve in the frequency spectrum of the echo signal, which is characteristic in each case, results as a function of the offset angle of the object. It is in principle the case that a gradient of the amplitude having a rising frequency increases in direct proportion to the size of the offset angle.

According to one specific embodiment of the present invention, the amplitude gradient in the frequency spectrum of the echo signal may therefore also be evaluated alternatively or in addition, in order to determine the absolute value of the relative offset angle of the object.

In principle, it is problematic that the evaluation of the frequency spectrum according to the present invention initially only makes it possible to ascertain an absolute value of the relative offset angle. However, according to one specific embodiment of the present invention, this problem is solved by determining the real offset angle with the aid of a second echo pulse. To that end, at least one second ultrasound pulse is transmitted by an ultrasound sensor situated on the vehicle, the second ultrasound pulse also including multiple predefined transmission frequencies which result in a variation of the directional characteristic of the ultrasound sensor. The second ultrasound pulse is also reflected on the object and is received again as a second echo pulse by the transmitting ultrasound sensor or another ultrasound sensor situated on the vehicle. The frequency spectrum of the second echo pulse is subsequently determined similarly to the evaluation of the first echo pulse and an absolute value of a relative offset angle of the object is determined as a function of the frequency spectrum of the second echo pulse and the directional characteristics. Finally, triangulation of the first and second absolute values of the offset value makes it possible to ascertain a real, i.e., signed, offset angle. This evaluation is based in principle on a second measurement from a changed position. The change of position may be caused by using a second ultrasound sensor and/or by a movement of the vehicle. If the vehicle is moved, the additional requirement must be met in that the change of position involves a change of the base distance necessary for the triangulation, which, for example, is the case when the vehicle passes laterally in relation to the object.

According to one specific embodiment of the present invention, the first and the second ultrasound pulses may thus be transmitted by different ultrasound sensors, or in the case of a moved vehicle, also by the same ultrasound sensor.

If the object is a moved object, the reception frequency is shifted in relation to the transmission frequency due to the so-called Doppler Effect. Consequently, the entire frequency spectrum of the echo signal is shifted accordingly. According to one specific embodiment of the present invention, such a shift of the frequency spectrum of the received echo pulse is determined in comparison with the frequency spectrum of the transmitted ultrasound pulse, and the absolute angular position is determined by taking this shift into account. In this way, it is possible to compensate for the Doppler Effect and thus to ensure reliable angular position values.

The shift of the frequency spectrum may, for example, be determined by comparing the lowest and/or the highest transmission frequency of the ultrasound pulse with a lowest and/or highest reception frequency of the echo pulse.

Additional features and advantages of specific embodiments of the present invention ensue from the following description with reference to the appended drawings.

BRIEF DESCRIPTION OF THE DRAWINGS

FIG. 2 shows a schematic flow chart of a method according to one specific embodiment of the present invention.

FIG. 3 shows a schematic representation of a frequency-dependent directional characteristic of an ultrasound sensor.

DETAILED DESCRIPTION OF THE INVENTION

Figure 1:
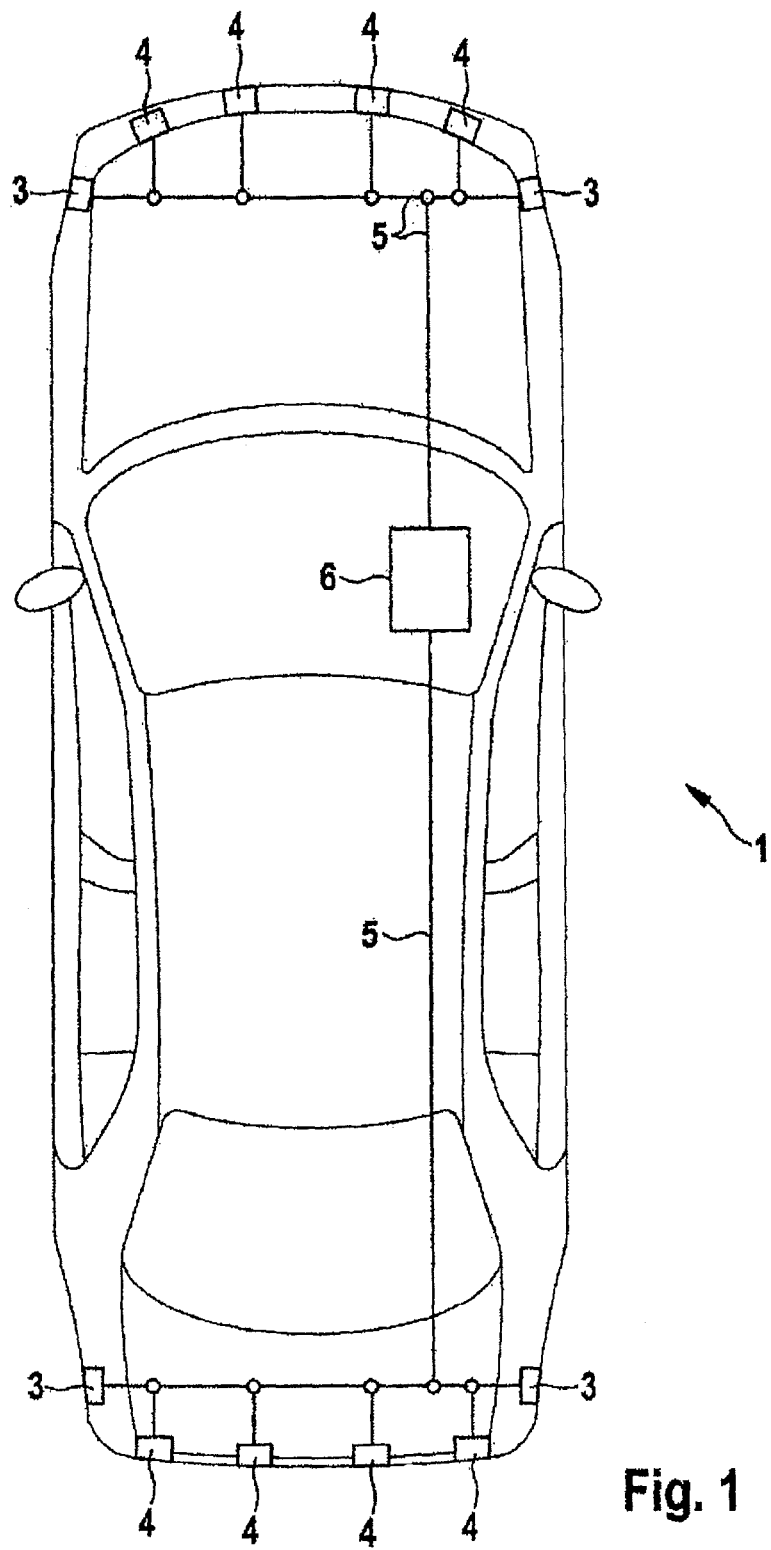
FIG. 1 shows a schematic top view of a motor vehicle having a device according to the present invention for determining the position of an object.

A motor vehicle 1 is represented in FIG. 1 which is equipped with a device according to the present invention for determining the position of an obstacle in relation to the motor vehicle. The device has two ultrasound sensors 3 situated on the left side and two ultrasound sensors 3 situated on the right side of the motor vehicle. Additional ultrasound sensors 4 are situated in the front area and in the rear area of motor vehicle 1. Ultrasound sensors 3 and 4 are connected to an evaluation unit 6 for evaluating the sensor signals via signal lines 5, which may be designed, for example, as a CAN bus or also as a point-to-point connection. A higher-level control unit, which is not shown, into which evaluation unit 6 may also be integrated, controls the transmission of ultrasound pulses with the aid of ultrasound sensors 3 and 4. Each of the ultrasound sensors has, for example, a piezo element which excites a diaphragm for transmitting ultrasound waves by electrical excitation. The ultrasound pulses are reflected from the surface of an object possibly located in the vehicle surroundings and are received again by the ultrasound sensors as echo pulses. To that end, the higher-level control unit may switch ultrasound sensors 3 and 4 into a receive mode. In the receive mode, the reflected ultrasound waves excite the diaphragm of the ultrasound sensors to vibrate. This vibration may be converted into electrical signals via the piezo element.

In addition to the described specific embodiment of ultrasound sensors 3 and 4 as ultrasonic transducers which allow a switch-over between transmit mode and receive mode, it is also possible to use ultrasound sensors having separated ultrasound transmitters and receivers. The evaluation electronics may, as shown, be situated centrally or also at least partially assigned in a decentralized manner to individual ultrasound sensors 3 and/or 4.

A curve of the method according to one specific embodiment of the present invention is shown schematically in FIG. 2 in the form of a flow chart. In a step S1, two ultrasound pulses are transmitted, the ultrasound pulses each including multiple predefined transmission frequencies, which result in a variation of the directional characteristic of the ultrasound sensor. It is advantageous in this context that frequency modulated ultrasound pulses are transmitted, in particular in the form of chirps.

The ultrasound pulses may in this connection be transmitted sequentially by a single ultrasound sensor 3 or 4, or alternatively by two different ultrasound sensors, preferably two adjacent ultrasound sensors. In this case, the ultrasound pulses may also be transmitted concurrently or at least overlapping.

In a step S2, the ultrasound pulses reflected on an object are received again as echo pulses. The echo pulses may be received by the ultrasound sensor which transmitted the associated ultrasound pulse, as well as by another ultrasound sensor situated on the motor vehicle. It is also immaterial for the application of the present invention whether both echo pulses are received by the same ultrasound sensor or by two different ultrasound sensors. For the ascertainment of a real offset angle of an object with the aid of triangulation, it is only important that an echo pulse is received from two different positions.

In a step S3, frequency spectra of the echo pulses are determined.

Figure 4:
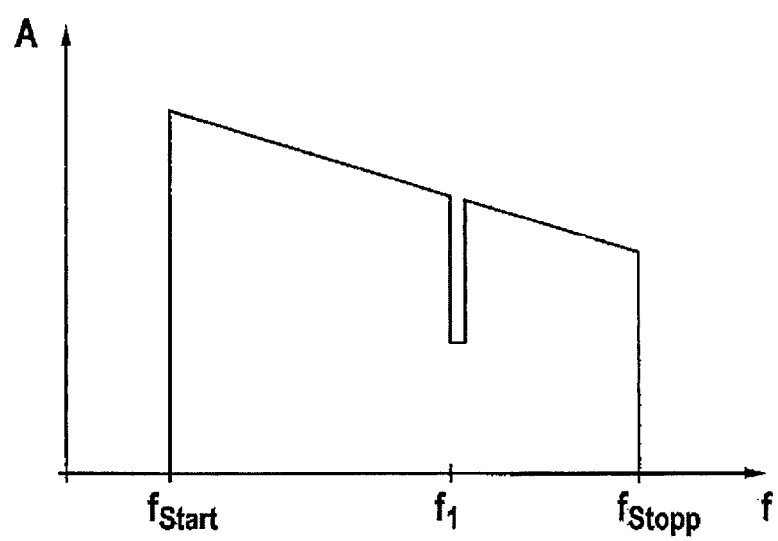
FIG. 4 shows a schematic representation of a frequency spectrum of an echo pulse.

In a step S4, absolute values of a relative offset angle of the object are determined in each case as a function of the frequency spectra of the echo pulses and the directional characteristics. This determination will be elucidated in still greater detail in the following with reference to FIGS. 3 and 4.

In a step S5, a real offset angle of the object is ascertained by triangulation of the first and second absolute values of the offset angle.

To take possible inaccuracies in the method into account, the ascertained values for the offset angle may also be stated in the form of an angular range around the ascertained value.

In the case of ultrasound sensors, the directional characteristic is in principle frequency-dependent, meaning that a changed transmission frequency changes the directional characteristic of the ultrasound sensor. FIG. 3 shows directional characteristics for several transmission frequencies selected as examples, such as those that occur, for example, in the case of an ultrasonic transmitter in the form of a rotary emitter. The directional characteristic describes the angular dependence of the strength of the transmitted ultrasound pulse. As is clearly evident, each directional characteristic possesses a characteristic shape which is different from the remaining directional characteristics.

In particular, starting from a certain transmission frequency, from 45 kHz in the exemplary case, significant minimums are formed, which separate a main lobe formed in the primary emission direction from side lobes.

Thus, for example, the directional characteristic associated with a transmission frequency of 50 kHz has minimums at an absolute emission angle of almost 60°. The result of this is that when operated at this frequency, the ultrasound sensor transmits only one signal having a very low amplitude in this direction. However, the result of this is in turn that an echo signal, which is reflected from an object in this same offset angle range, also has a very low amplitude.

According to the present invention, an ultrasound pulse is now transmitted, which includes multiple predefined transmission frequencies. This may, for example, be achieved by modulating the transmission frequency in a range between 20 kHz and 70 kHz. For example, it may now be assumed that an object is positioned at an offset angle of almost 60° in relation to the ultrasound sensor. In this case, the frequency spectrum of the echo pulse based on the transmitted ultrasound pulse has a curve as shown schematically in FIG. 4.

This frequency spectrum basically has a ramp-shaped curve, the amplitude successively being reduced from a starting frequency $f_{start}$ of 20 kHz in the exemplary case, to a stopping frequency $f_{stop}$ of 70 kHz in the exemplary case. At a frequency $f_1$ of 50 kHz, the frequency spectrum has a noticeable minimum. From this it may now be inferred that the object to be detected must have a relative offset angle at which the directional characteristic associated with the transmission frequency of 50 kHz also has a minimum. However, since the directional characteristics for the individually predefined transmission frequencies are known (see FIG. 3), it may be clearly inferred from this that the object must have an absolute relative offset angle of 60°, i.e., a real relative offset angle of +60° or −60°. If needed, this uncertainty may be eliminated, for example, in the described manner with the aid of triangulation.

However, due to the different shapes, in particular the different gradients, of the individual directional characteristics, an amplitude curve in the frequency spectrum of the echo signal, which is characteristic in each case, results as a function of the offset angle of the object. It is in principle the case that a gradient of the amplitude having a rising frequency increases in direct proportion to the size of the offset angle. This means that the dipping ramp of the frequency spectrum (see FIG. 4) between starting frequency $f_{start}$ and stopping frequency $f_{stop}$ is steeper in direct proportion to the size of the offset angle. Thus, in the exemplary case of an object having an offset angle of almost 60°, not only the formation of the minimum in the frequency spectrum is characteristic, but also the amplitude gradient in the frequency spectrum. If the directional characteristics are known, it is consequently also possible to ascertain the absolute offset angle by evaluating the amplitude gradient.

Since the efficiency and thus the emitted power drops rapidly in the case of transmission frequencies far above the resonance frequency of the ultrasound sensor, it is practically impossible to increase the transmission frequency so far that minimums are developed in the directional characteristic and thus also in the frequency spectrum of the echo signal even in an angular range near the primary emission direction. For the directional characteristics shown by way of example in FIG. 3, this affects the angular range between −30° and +30°. In this angular range, it is thus of particular advantage to determine the absolute offset angle as a function of the amplitude gradient. The evaluation of the amplitude gradient is, however, by no means limited to this angular range, but instead it may also be used alternatively or additionally in angular ranges in which minimums are also formed in the frequency characteristic and thus in the frequency spectrum of the echo signal.

If the object to be detected is a moved object, the reception frequency is shifted in relation to the transmission frequency due to the so-called Doppler Effect. Consequently, a correspondingly shifted frequency spectrum of the echo signal results. If this effect is not compensated, this results in errors in determining the offset angle. It is therefore provided to detect such a shift of the frequency spectrum of the received echo pulse in comparison with the frequency spectrum of the transmitted ultrasound pulse and to determine the absolute angular position, taking this shift into account. In the simplest case, such a shift is determined by comparing the lowest and/or highest transmission frequency of the ultrasound pulse with a lowest or highest reception frequency of the echo pulse, i.e., starting frequency $f_{start}$ or stopping frequency $f_{stop}$.

In addition to the parking space measurement or an automatic parking function, the method according to the present invention and the device according to the present invention are, of course, also usable for any other driver assistance systems in which the position of an object in the surroundings of the vehicle plays a role. Thus, for example, a collision warning system and/or a system for mitigation of collision consequences might be improved significantly by using the method according to the present invention.

What is claimed is:

1. A method for determining a position of an object in relation to a motor vehicle, for use in a driver assistance system of the motor vehicle, comprising:
    transmitting, by a first ultrasound sensor situated on the vehicle, a first ultrasound pulse including multiple predefined transmission frequencies which result in a variation of directional characteristics of the first ultrasound sensor;
    receiving, by one of the first ultrasound sensor or a second ultrasound sensor situated on the vehicle, the first ultrasound pulse reflected by the object as a first echo pulse;
    determining a frequency spectrum of the first echo pulse; and determining a first absolute value of a relative offset angle of the object as a function of the frequency spectrum of the first echo pulse and the directional characteristics of the first ultrasound sensor.

2. The method as recited in claim 1, wherein a frequency-modulated ultrasound pulse in the form of a chirp is transmitted.

3. The method as recited in claim 2, wherein the absolute value of the relative offset angle is determined based on minimums in the frequency spectrum.

4. The method as recited in claim 2, wherein the absolute value of the relative offset angle is determined based on an amplitude gradient in the frequency spectrum.

5. The method as recited in claim 1, further comprising:
   transmitting, by one of the first or second ultrasound sensor, at least one second ultrasound pulse including multiple predefined transmission frequencies which result in a variation of directional characteristics of the ultrasound sensor;
   receiving, by one of the first or second ultrasound sensor, the second ultrasound pulse reflected by the object as a second echo pulse;
   determining a frequency spectrum of the second echo pulse;
   determining a second absolute value of a relative offset angle of the object as a function of the frequency spectrum of the second echo pulse and the directional characteristics of the one of the first or second ultrasound sensor transmitting the second ultrasound pulse; and
   determining a real offset angle by triangulation of the first and second absolute values of the relative offset angle.

6. The method as recited in claim 5, wherein the first and the second ultrasound pulses are transmitted by the first ultrasound sensor in a moving vehicle.

7. The method as recited in claim 5, wherein the first and second ultrasound pulses are transmitted by different ultrasound sensors.

8. The method as recited in claim 1, wherein a shift of the frequency spectrum of the received first echo pulse is determined in comparison with the frequency spectrum of the transmitted first ultrasound pulse, and wherein the first absolute value of the relative offset angle is determined by taking the shift of the frequency spectrum into account.

9. The method as recited in claim 8, wherein the shift of the frequency spectrum is determined by comparing at least one of the lowest and the highest transmission frequency of the first ultrasound pulse with one of a lowest or highest reception frequency of the first echo pulse.

10. A device for determining a position of an object in relation to a motor vehicle, for use in a driver assistance system of the motor vehicle, comprising:
    at least one ultrasound transmitter for transmitting at least one ultrasound pulse including multiple predefined transmission frequencies which result in a variation of directional characteristics of the ultrasound transmitter;
    an ultrasound receiver for receiving the ultrasound pulse reflected by the object as an echo pulse; and
    an evaluation unit for determining (i) a frequency spectrum of the echo pulse, and (ii) an absolute value of a relative offset angle of the object as a function of the frequency spectrum of the echo pulse and the directional characteristics of the ultrasound transmitter.

* * * * *